US006951576B1

(12) United States Patent
Takeuchi (10) Patent No.: US 6,951,576 B1
(45) Date of Patent: Oct. 4, 2005

(54) WOUND ELEMENT ELECTRODE ASSEMBLY DESIGN FOR USE IN PRISMATIC CASE ELECTROCHEMICAL CELLS

(75) Inventor: Esther S. Takeuchi, East Amherst, NY (US)

(73) Assignee: Wilson Greatbatch Ltd., Clarence, NY (US)

(*) Notice: Subject to any disclaimer, the term of this patent is extended or adjusted under 35 U.S.C. 154(b) by 0 days.

(21) Appl. No.: 09/176,374

(22) Filed: Oct. 21, 1998

Related U.S. Application Data (60) Provisional application No. 60/062,871, filed on Oct. 21, 1997.

(51) Int. Cl.[7] .......................... H01M 6/10; H01M 10/04
(52) U.S. Cl. ....................... 29/623.1; 429/94; 429/133; 429/164; 429/246
(58) Field of Search .................. 429/94, 131, 133, 429/140, 211, 246; 29/623.1

(56) References Cited

U.S. PATENT DOCUMENTS

| | | | |
|---|---|---|---|
| 2,928,888 A | * | 3/1960 | Vogt |
| 3,298,871 A | * | 1/1967 | Binder et al. |
| 4,709,472 A | * | 12/1987 | Machida et al. ............ 29/623.1 |
| 5,017,442 A | * | 5/1991 | Watanabe et al. ............. 429/94 |
| 5,439,760 A | | 8/1995 | Howard et al. ............... 429/94 |
| 5,549,717 A | * | 8/1996 | Takeuchi et al. ............ 29/623.2 |

* cited by examiner

*Primary Examiner*—Patrick Ryan
*Assistant Examiner*—Tracy Dove
(74) *Attorney, Agent, or Firm*—Hodgson Russ LLP

(57) ABSTRACT

An anode-cathode sub-assembly for an electrochemical cell wherein a combination of an elongated alkali metal anode and elongated solid cathode within separator therebetween is wound using a mandrel to form the sub-assembly having a jellyroll type configuration and wherein the winding is performed in a manner so that upon removal of the mandrel from the completed sub-assembly, in the event any portion of the separator contacted by the mandrel is impaired, this will not cause an electrical short circuit in an electrochemical cell containing the sub-assembly.

19 Claims, 6 Drawing Sheets

FIG. 15

WOUND ELEMENT ELECTRODE ASSEMBLY DESIGN FOR USE IN PRISMATIC CASE ELECTROCHEMICAL CELLS

CROSS REFERENCE TO A RELATED APPLICATION

Applicant hereby claims priority based on Provisional Application No. 60/062,871 filed Oct. 21, 1997 and entitled "Wound Electrode Assembly Design For Use In Prismatic Case Electrochemical Cells" which is incorporated herein by reference.

BACKGROUND OF THE INVENTION

This invention relates to the art of electrochemical cells, and more particularly to a new and improved wound element electrode assembly for use in lithium batteries for delivering high current pulses.

One area of use of the present invention is a battery for operating an implantable cardiac defibrillator, although the principles of the present invention can be variously applied. The purpose of the implantable defibrillator is to prevent sudden death from lethal arrhythmia, and in operation the device continuously monitors the heart rate of the patient, is able to recognize ventricular fibrillation, and subsequently delivers a high energy shock to defibrillate the heart. In order to power this device, implantable high rate batteries have been developed which have the ability to deliver a current pulse and rapidly recover the open circuit voltage.

Examples of batteries having high capacity, low self-discharge and good pulsing behavior at all levels are shown and described in U.S. Pat. Nos. 4,830,940 and 5,549,717. Manufacture of the cell stack assembly in the battery of U.S. Pat. No. 4,830,940 includes, briefly, folding the anode to form a serpentine-like structure, placing individual cathode plates between the folds of the anode structure, and then making electrical connection including welding operations to individual leads of each of the plurality of cathode plates.

U.S. Pat. No. 5,549,717 is directed improved high rate battery which reduces the time required to manufacture the cell stack assembly while maintaining the requisite safety and reliability standards in operation. The combination of elongated anode and cathode electrodes is wound using a mandrel to form an anode-cathode sub-assembly having a jellyroll type configuration and shaped so that the resulting sub-assembly has a substantially rectangular configuration for assembly into a cell casing of prismatic shape.

In the manufacture of a wound anode-cathode sub-assembly using a mandrel, it is important to insure that removal of the mandrel from the completed sub-assembly does not cause any damage which ultimately could adversely affect the operation of the electrochemical cell in which the anode-cathode sub-assembly ultimately is used.

It would, therefore, be highly desirable to provide a new and improved wound anode-cathode sub-assembly and method of making the same which maintains the requisite safety and reliability standards in the operation of an electrochemical cell in which the sub-assembly is used.

SUMMARY OF THE INVENTION

The present invention provides an anode-cathode sub-assembly for an electrochemical cell wherein a combination of an elongated alkali metal anode and elongated solid cathode with separator therebetween is wound using a mandrel to form the sub-assembly having a jellyroll type configuration and wherein the winding is performed in a manner so that upon removal of the mandrel from the completed sub-assembly, in the event any portion of the separator contacted by the mandrel is impaired, this will not cause an electrical short circuit in an electrochemical cell containing the sub-assembly.

DETAILED DESCRIPTION OF THE ILLUSTRATED EMBODIMENTS

Figure 1:
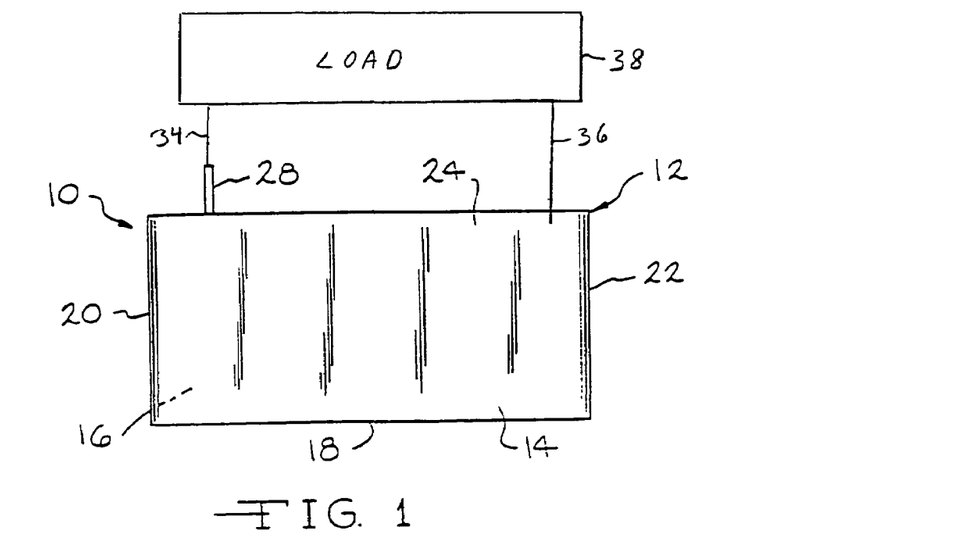
FIG. 1 is a side elevational view of an electrochemical cell including an anode-cathode sub-assembly according to the present invention.
Figure 2:
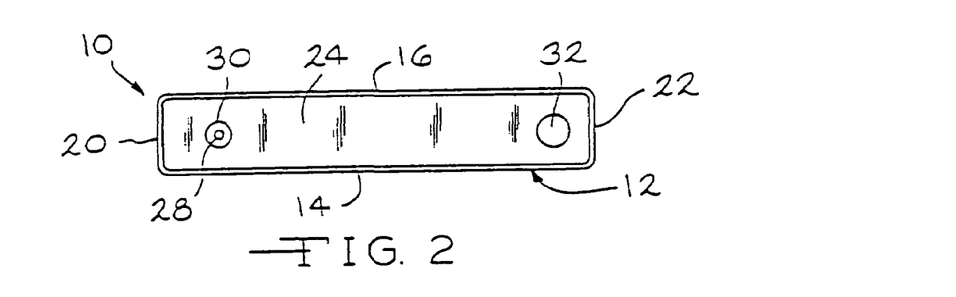
FIG. 2 is a top plan view thereof.

FIGS. 1 and 2 show a prismatic, high rate electrochemical cell 10 including the anode-cathode sub-assembly according to the present invention. Cell 10 includes an electrically conductive casing 12 of metal such as stainless steel. Casing 12 includes a pair of flat-faced sidewalls 14, 16 in opposed, substantially mutually parallel relation joined by a bottom wall 18 and a pair of end walls 20, 22 which meet the sidewalls 14, 16 at substantially rounded corners. Casing 12 is completed by a conductive lid 24 which is hermetically sealed thereto such as by welding. By prismatic it is meant that the cell casing includes flat faces on the side walls, wherein if desired the bottom and end walls can be curved in a manner which will be described.

The conductive casing 12 serves as one electrical terminal of cell 10 in a known manner. The opposite polarity terminal of cell 10 is provided by a terminal pin 28 extending outwardly from lid 24 and electrically insulated therefrom by an insulator element 30. Lid 24 is provided with a fill opening for supplying liquid electrolyte to the interior of casing 12 in a manner which will be described, and this opening is sealed closed by a cap or closure 32 welded to lid 24 in a known manner.

Cell 10 is illustrated in FIG. 1 connected by leads or conductors 34 and 36 to a load 38 which can be an implantable cardiac defibrillator in the manner described in U.S. Pat. No. 4,830,940 issued May 16, 1989, the disclosure of which is hereby incorporated by reference.

Figure 4:
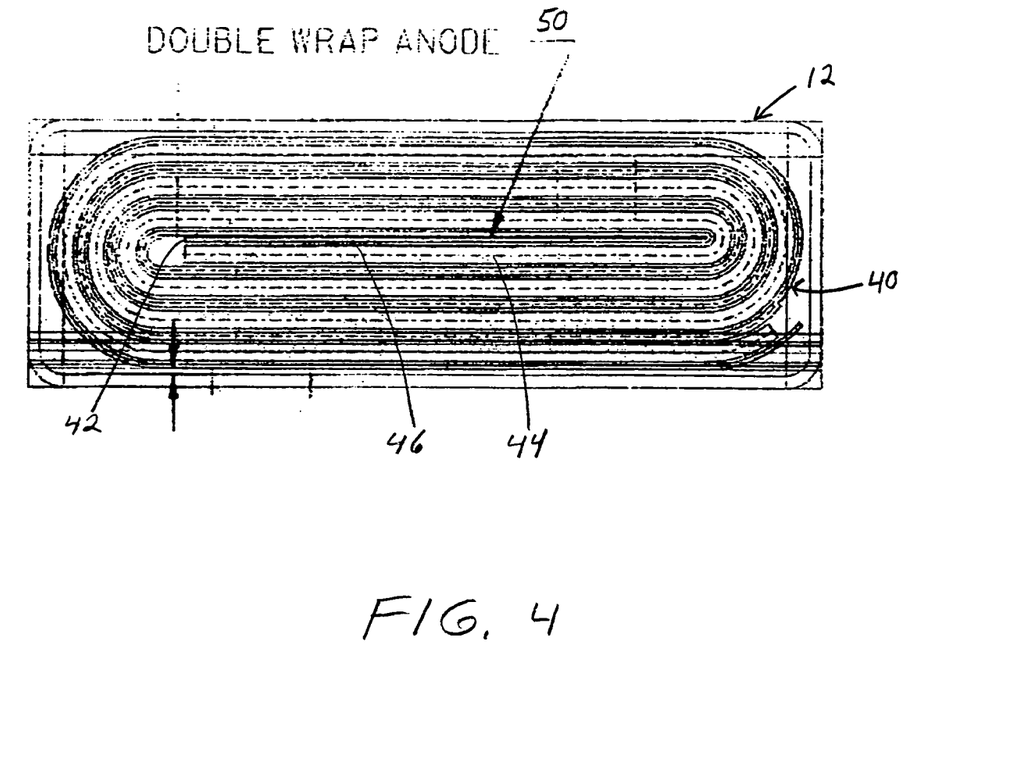
FIG. 4 is a cross-sectional view of an anode-cathode sub-assembly according to the present invention.

Referring now to FIG. 4, the cell 10 includes an anode-cathode sub-assembly generally designated 40 which is in a jellyroll type configuration as known to those skilled in the art and which additionally is shaped to have a substantially rectangular cross-section. The jellyroll configuration of the anode-cathode sub-assembly advantageously simplifies the structure of and reduces the manufacturing time for the anode-cathode sub-assembly, and the rectangular cross-section of the anode-cathode sub-assembly enables it to be incorporated in a prismatic cell casing. The anode-cathode sub-assembly 40 is formed by folding or winding the combination of elongated anode and cathode electrodes with separator therebetween using a mandrel as will be described in detail presently and which, in accordance with the present invention, is performed in a manner so that upon removal of the mandrel from the completed sub-assembly, in the event any portion of the separator contacted by the mandrel is impaired this will not cause an electrical short circuit in an electrochemical cell containing the sub-assembly.

Briefly, the anode-cathode sub-assembly 40 comprises the combination of an elongated alkali metal anode 42, an elongated solid cathode 44 and separator 46 therebetween in a face-to-face relationship which combination is wound on a mandrel (not shown in FIG. 4) to form the anode-cathode sub-assembly 40 of jellyroll type configuration which has a substantially rectangular configuration so as to be received in the casing 12 of hollow rectangular configuration. In the sub-assembly 40 illustrated in FIG. 4, anode 42 is encased or encapsulated in separator material 46, i.e., the separator material 46 is on both surfaces of anode 42 which face toward the cathode 44. Alternatively, cathode 44 can be encased or encapsulated in separator material. For a more detailed description of elongated anodes and cathodes encased or encapsulated in separator material, reference may be made to the aforementioned U.S. Pat. No. 4,830,940. As a further alternative in the sub-assembly 40, a separate strip of separator material can be sandwiched between the anode and cathode strips.

By way of example, in an illustrative sub-assembly 40, cathode 44 has a thickness of about 0.0218 inch, separator 46 has a thickness of about 0.0045 inch, anode 42 has a thickness of about 0.0101 inch on the inside of the wound anode assembly where the anode has cathode 44 on both sides of it, and the remainder of anode 42 has a thickness of about 0.0055 inch where it faces the cathode on only one side.

In accordance with the present invention, in the anode-cathode sub-assembly illustrated in FIG. 4, at the innermost portion of the sub-assembly anode 42 is folded upon itself to define a double wrap portion or pocket designated 50 in FIG. 4 which includes two sections of anode 42 facing each other with only separator 46 therebetween. As a result, in the event of damage or impairment of any portion of separator 46 within the double wrap portion or pocket 50, which could occur as the mandrel is withdrawn after winding the sub-assembly 40, only the facing sections of anode 42 can contact each other thereby preventing any electrical short circuit in an electrochemical cell in which anode-cathode sub-assembly 40 is employed. In other words, in the region of the sub-assembly where separator 46 could be damaged, there is no anode-cathode interface, i.e. anode 42 cannot contact any portion of cathode 46, thereby preventing an electrical short circuit. In an alternative arrangement of an anode-cathode sub-assembly, at the inner-most portion of the sub-assembly the cathode can be folded upon itself to define a double wrap portion or pocket similar to pocket 50 in the sub-assembly of FIG. 4 and provide the same advantageous result.

Figure 5:
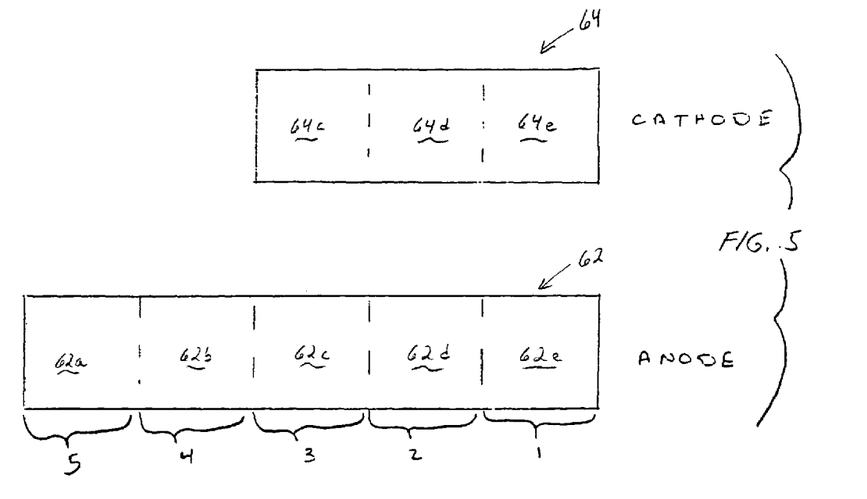
FIG. 5 is a diagrammatic view illustrating one aspect of the method of forming the anode-cathode sub-assembly of FIG. 4.
Figure 6:
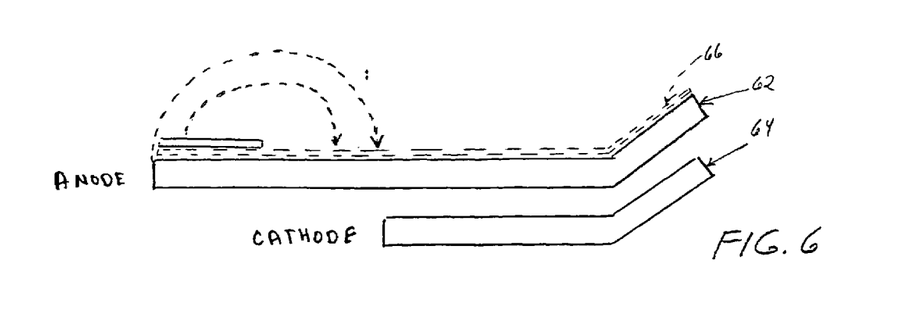
FIG. 6 is a diagrammatic view illustrating one stage in the method of forming the sub-assembly of FIG. 4.
Figure 7:
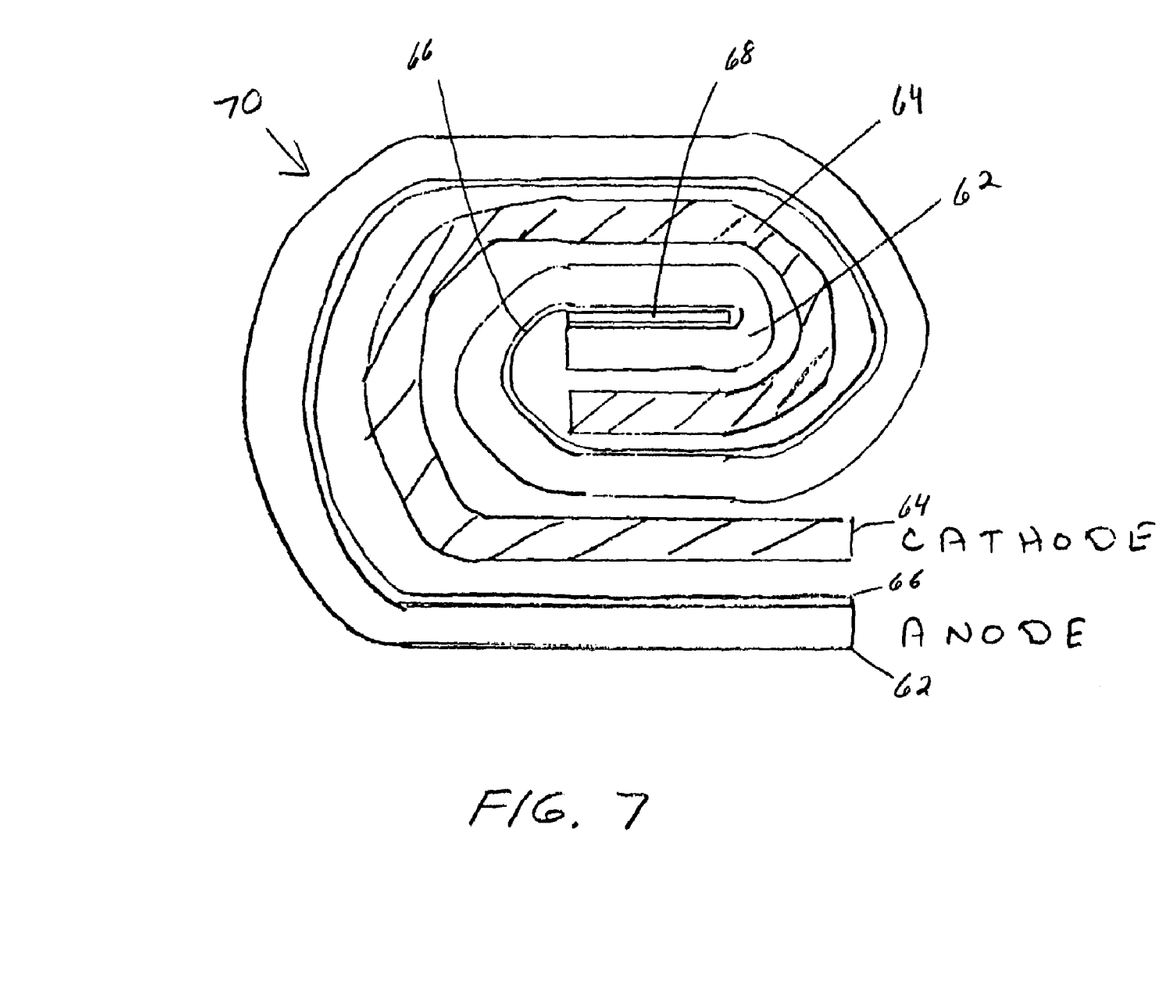
FIG. 7 is a diagrammatic view illustrating another stage in the method of forming the sub-assembly of FIG. 4.

The foregoing is illustrated further by the diagrammatic views of FIGS. 5–7. Anode 62 in FIG. 5 is representative of anode 42 in the sub-assembly 40 of FIG. 4, and cathode 64 in FIG. 5 is representative of cathode 44 in FIG. 4. In the embodiment of the present invention wherein two sections of the anode face each other to define the double wrap portion or pocket as previously described, the anode is longer than the cathode. Thus, as shown in FIG. 5, anode 62 includes five sections of equal length 62*a*, 62*b*, 62*c*, 62*d* and 62*e*. Cathode 64 is shorter in length than anode 62 and includes three sections of equal lengths 64*c*, 64*d* and 64*e*. In an alternative embodiment where two sections of the cathode would face each other to define the double wrap portion or pocket, the cathode would be longer than the anode.

The cathode 64 is fabricated by having an active material on both sides of an elongated screen. The anode 62 is fabricated with lithium on a screen. For highest efficiency, the lithium is on both sides of the screen where the anode is on the inside of the wind and has cathode opposing both sides. The remainder of the anode has lithium on only one side, the side facing the active cathode material. Where the anode faces the case or itself, the lithium is only on one side of the screen.

FIGS. 5–7 show the electrode elements 62 and 64 as rectangular with parallel edges. The electrode elements may be scalloped in form such that the final cell design would provide a cell stack with at least one side with a half-round side to make the cell stack suitable for use in a case with a half-round configuration. This will be described in further detail presently.

The wind is begun by aligning the anode 62 and cathode 64 along the respective longitudinal edges thereof. A separator material 66 is between the anode and the cathode and is shown in broken lines in FIG. 6 for simplicity. One or more layers of separator may be used. The separator may be sealed around each electrode element 62, 64 to form a "bag" or it may be sealed around one element. Alternatively, the separator may be used without heat sealing. The winding or folding of anode 62, cathode 64 and separator 66 is performed using a mandrel represented diagrammatically at 68. The first fold is toward the anode where the anode is folded on itself. This is about the lateral intersection of the anode sections 62*a* and 62*b* as illustrated in FIG. 6. The wind is continued to produce a sub-assembly 70 such as is shown in FIG. 7. In particular, the second fold is about the lateral intersection of the anode sections 62*b* and 62*c*. The third and fourth folds are about the lateral intersections between anode sections 62*c*, 62*d* and 62*d*, 62*e*, respectively and the corresponding lateral intersections between cathode sections 64*c*, 64*d* and 64*d*, 64*e*, respectively. The size of mandrel 68, the lengths of the folded anode and cathode sections and the number of those sections all can be varied depending upon the desired size of the resulting sub-assembly.

After completing the wind to form the sub-assembly 70, the mandrel 68 typically is removed. The advantage of the foregoing method and sub-assembly design is that often during the removal of a winding mandrel, there can be a tear in the separator material, particularly if the cell stack wind is tight. By beginning the wind with anode folded on anode, a tear in the separator becomes inconsequential since no short circuit can be formed inside the cell. That is because in the region of the sub-assembly 70 from which mandrel 68 is removed, only portions of the anode 62 are facing each other. If the portions of the anode contact each other, the fact that electrodes of like electrical polarity contact each other will not cause an electrical short circuit. The same advantages and results are obtained in a method and sub-assembly where the first fold of the winding operation causes the cathode to be folded upon itself.

Figure 8:
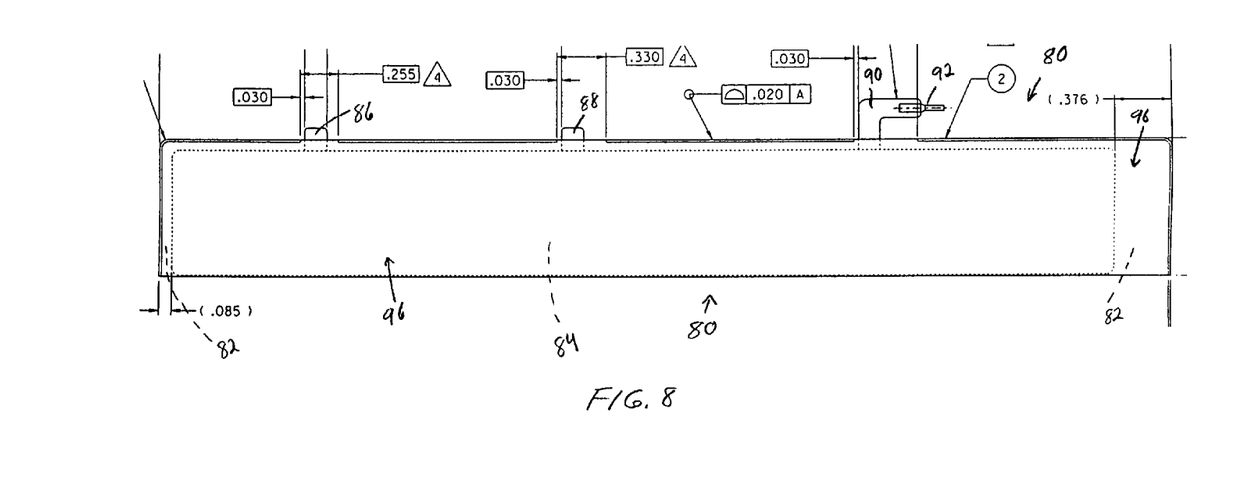
FIG. 8 is a side elevational view of one form of cathode for use in the anode-cathode sub-assembly of the present invention.
Figure 9:
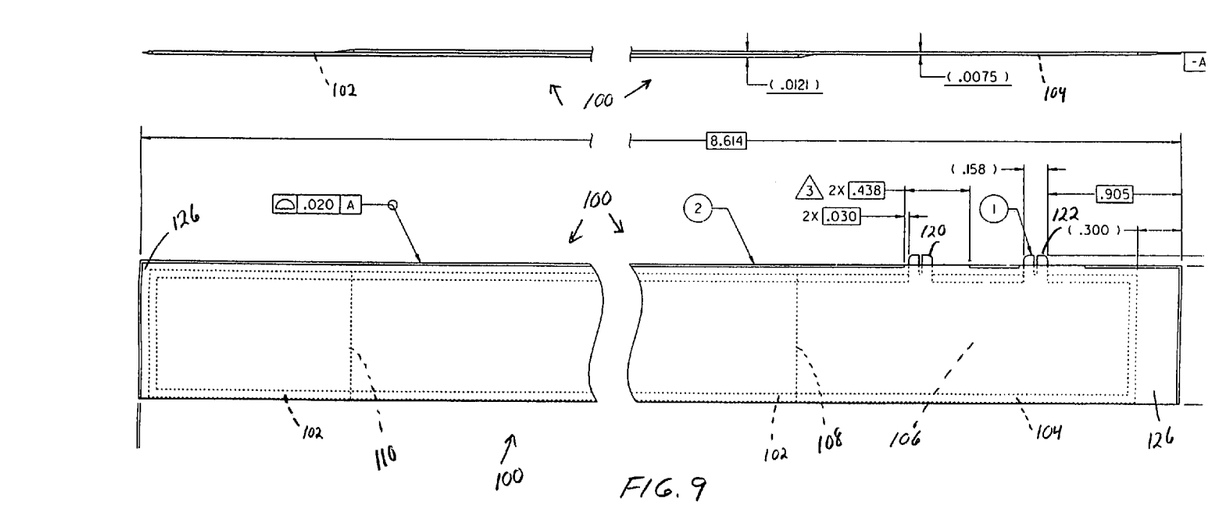
FIG. 9 is a side elevational view of one form of anode for use in the anode-cathode sub-assembly of the present invention.

FIGS. 8 and 9 illustrate in further detail typical anode and cathode electrodes for use in the cell assembly of the present invention. Cathode 80 in FIG. 8 is illustrative of cathodes 44 and 64 in the foregoing descriptions. In particular, cathode 80 comprises a body 82 of cathode active material in the form of an elongated strip having a length many times greater than the width thereof and which is relatively thin. Cathode active material 82 can have various forms, and one exemplary material contains silver vanadium oxide. For a more detailed description of this illustrative cathode material and a method of making the same, reference may be made to the aforementioned U.S. Pat. No. 4,830,940. Cathode 80 further comprises a cathode current collector 84 in the form of a thin sheet of metal screen, for example of titanium, which extends along substantially the entire length and width of the cathode material 82 and is entirely embedded therein. The cathode 80 shown in FIG. 8 is provided with a pair of tabs or electrical leads 86, 88 for making electrical connection thereto. Tabs 86, 88 can be formed integral with current collector 84 or formed by removing sections of cathode material 82 where tabs 86, 88 are to be located and then attaching the tabs 86, 88 to the cathode current collector such as spot welding. Tabs 86, 88 are disposed in the plane of cathode body 82 and extend outwardly from one side edge of body 82 in substantially mutually parallel relation. Tabs 86, 88 are relatively thin, and while two tabs are shown, this is by way of illustration.

Cathode 80 also is formed to include a cathode connector tab 90 extending from the same edge of current collector 84 as tabs 86, 88. Connector tab 90 is at a location on current collector 84 relative to lead tabs 86, 88 so that upon completion of the anode-cathode sub-assembly, lead tabs 86, 88 and connector tab 90 can be joined together for making electrical connection between cathode 80 and a cell terminal. This will be shown and described in detail presently. Connector tab 90 is provided with a coupling element 92 on the end thereof to facilitate connection to an electrical lead or connector for joining tab 90 to the aforementioned cell terminal.

Cathode body 82 is contained or encased in an envelope of separator material generally designated 96. One method for encasing cathode 80 includes providing a strip of separator material somewhat longer than cathode 80 and twice as wide. The separator strip is folded along the long axis. Cathode 80 is placed into the fold with the side edge thereof opposite extending tabs 86, 88 and connector 90 abutting the fold. The three open edges of the separator are bonded by heat sealing which melts the separator and allows the upper layer to bond with the lower layer. The material of separator 96 is of the type which does not block the flow of ions therethrough, and examples of suitable-separator material are polypropylene and polyethylene such as Celgard 2400 separator material.

The anode 100 shown in FIG. 9 is illustrative of anodes 42 and 66 in the foregoing descriptions and comprises a pair of elongated alkali metal elements 102, 104 preferably in the form of thin lithium strips, on opposite surfaces of an anode current collector 106 in the form of a screen of metal such as nickel. In particular, lithium strip 102 has a length many times the width thereof and extends from one end of anode 100, i.e. the left-hand end as viewed in FIG. 9, to a location shortly beyond mid-way of the length of anode 100 where it terminates in an edge 108. Lithium strip 104 extends from an edge 110 inwardly of the left-hand end of anode 100 as viewed in FIG. 9 and extends to the opposite end, i.e. right-hand end, of anode 100. In the arrangement shown, lithium strip 104 is longer than strip 102. The provision of one lithium anode strip being significantly shorter in length than the other is for a purpose which will be described presently. The anode assembly 100 is provided with a pair of electrical leads or tabs 120, 122 for making electrical connection thereto. Tabs 120, 122 are located near one end of assembly 80, i.e. the right-hand as viewed in FIG. 9, and is attached to the current collector 106 such as by spot welding. Tabs 120, 122 are disposed in the plane of anode assembly 80 and extend outwardly from one side edge thereof. The combination of anode strips 102, 104 and current collector 106 is contained or encased in an envelope of separator material 126 in a manner similar to that of cathode 80.

Figure 10:
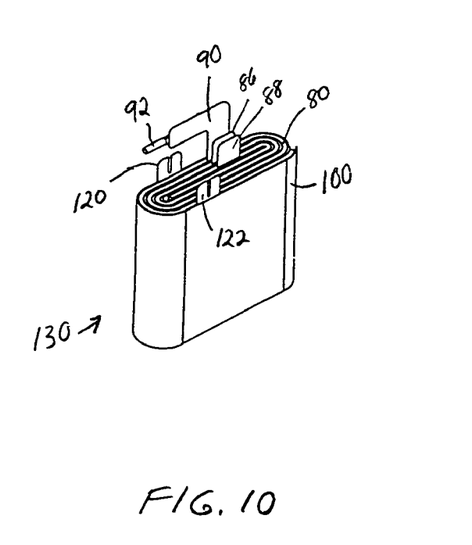
FIG. 10 is a perspective view of a completed anode-cathode sub-assembly according to the present invention including the cathode and anode of FIGS. 8 and 9, respectively.

FIG. 10 shows a completed anode-cathode sub-assembly 130 according to the present invention and including cathode 80 and anode 100 of FIGS. 8 and 9, respectively. Anode tabs or leads 120, 122 extend out from one the top of sub-assembly 130 as viewed in FIG. 10 and are located near one end of the sub-assembly. Cathode leads or tabs 86, 88 extend out from the top of sub-assembly 130 near the opposite end thereof and are in lateral registry or alignment. Cathode connector tab 90 is adjacent leads 86, 88 and the combination is joined together such as by welding (not shown in FIG. 10) to enable electrical connection to be made between the cell external terminal to cathode 80 via connector tab 90 and lead tabs 86, 88.

As previously described, the one anode lithium strip 104 is longer than lithium strip 102. Around the periplexy of the anode-cathode sub-assembly 130 there is only one surface of cathode 80 available for operative contact with anode 100. Therefore, this portion of the length of anode 100 requires only one lithium strip. Within the sub-assembly 130 opposed surfaces of cathode 80 are available for operative contact with anode 100 and this therefore requires two lithium strips on opposite surfaces of the anode current collector. This form of anode structure advantageously reduces the amount of lithium required which, in turn, yields savings in cost and size for the resulting cell. The foregoing is shown and described in further detail in the aforementioned U.S. Pat. No. 5,549,717, the disclosure of which is hereby incorporated by reference.

Figure 3:
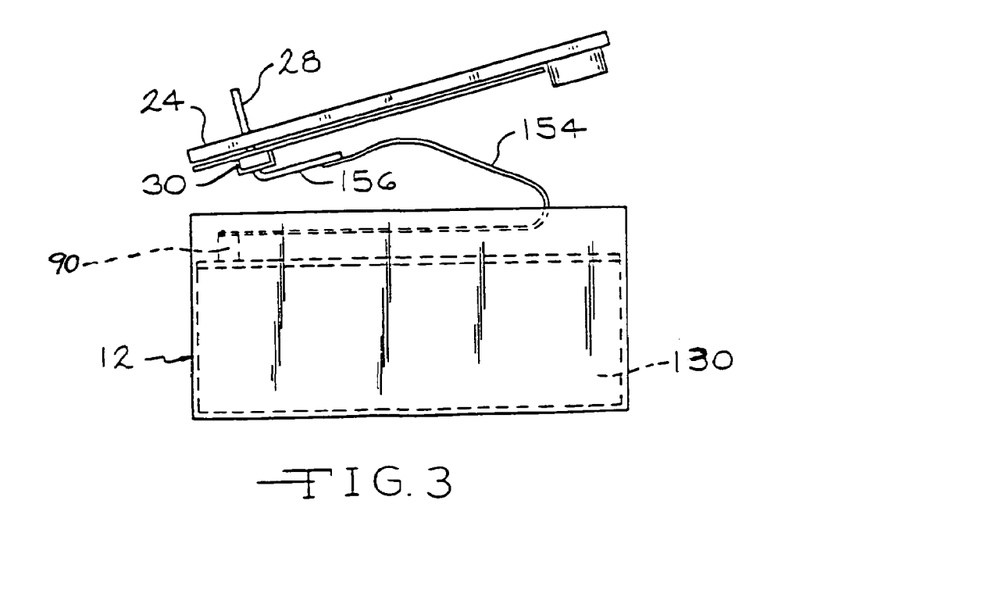
FIG. 3 is a developed view illustrating an assembly stage in the manufacture of the cell of FIGS. 1 and 2.

The anode-cathode sub-assembly formed by the method of the present invention is placed in the cell casing 12, and the substantially rectangular cross-section of the sub-assembly enables it to be properly received in a prismatic casing 12 of the type shown in FIGS. 1–3. The anode leads 120, 122 from the sub-assembly are connected to casing 12 by welding. FIG. 3 shows the anode-cathode sub-assembly 130 which has been so placed in casing 12 and where the anode leads have been welded to casing 12 as described. In the illustrative arrangement shown in FIG. 3, cathode connector tab 90 is welded to a connecting lead 154 which, in turn, is welded to an extension 156 of terminal pin 28 which is insulated from lid 24 by an insulator structure 30 in a known manner. Other connecting arrangements can of course be employed. Accordingly, the relatively few leads requiring welding operations for making electrical connections and the manner of making the connections result in a significant simplification and reduction in time of this portion of the manufacture of the cell.

After the foregoing operation is completed, lid 24 is welded to casing 12 to provide an hermetic seal in a known manner, liquid electrolyte such as that disclosed in U.S. Pat. No. 4,830,940 is introduced through the fill opening in lid 24 to the sub-assembly 150, whereupon cap 32 is welded to lid 24 complete the hermetic seal in a known-manner.

Figure 11:
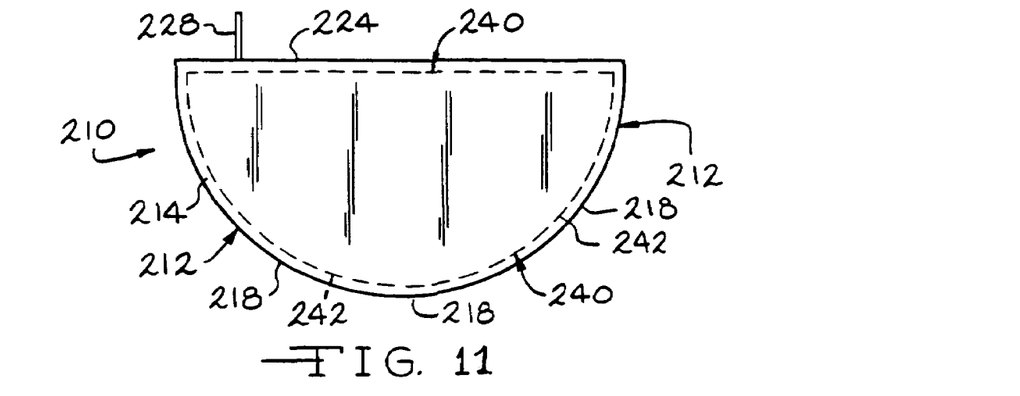
FIG. 11 is a side elevational view of a solid cathode liquid electrolyte alkali metal high rate battery including an anode-cathode sub-assembly according to another embodiment of the present invention.
Figure 12:
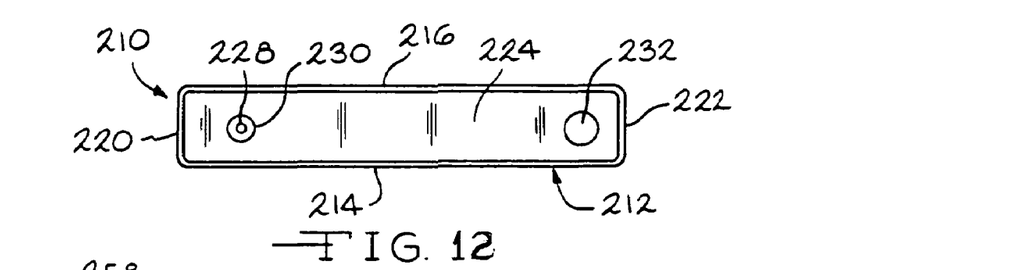
FIG. 12 is a top plan view thereof.

FIGS. 11 and 12 show a prismatic, high rate cell 210 including an electrically conductive casing 212 of metal such as stainless steel including a pair of flat-faced sidewalls 214, 216 in opposed, substantially mutually parallel relation joined by a curved bottom wall 218. A pair of end walls 220, 222 meet the sidewalls 214, 216 at substantially rounded corners. If desired, end walls 220, 222 also could be curved. Casing 212 is completed by a conductive lid 224 which is hermetically sealed thereto such as by welding.

The conductive casing 212 serves as one electrical terminal of cell 210 in a known manner. The opposite polarity terminal of cell 210 is provided by a terminal pin 228 extending outwardly from lid 224 and electrically insulated therefrom by an insulator element 230. Lid 224 is provided with a fill opening for supplying liquid electrolyte to the interior of casing 212 in a manner like that described for cell 10, and this opening is sealed closed by a cap or closure 232 welded to lid 224 in a known manner.

Except for the curved bottom wall 218 of cell 210 and the flat bottom wall 18 of cell 10, the two prismatic cells 10 and 210 shown in FIGS. 1 and 11, respectively, are identical. Thus, like cell 10, the cell 210 of FIGS. 11 and 12 includes an anode-cathode sub-assembly 240 which is substantially similar to the anode-cathode sub-assemblies of the previous embodiments, i.e. has a substantially rectangular cross-section. In this embodiment, however, sub-assembly 240 is provided with a curved surface 242 to accommodate the curved bottom wall 218 of cell casing 212. In order to provide the curved surface 242 of sub-assembly 240, the anode and cathode electrodes together with the separator are provided with a scalloped formation along one edge thereof, as compared to the rectangular shaped anode and cathode electrodes and separator of cell 10 where both the edges are straight.

Figure 13:
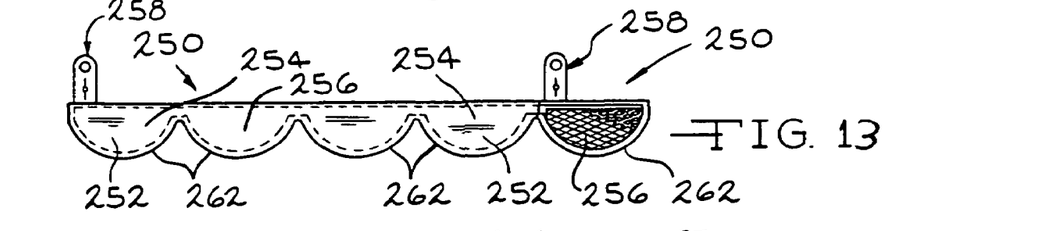
FIG. 13 is a side elevational view of the anode in the sub-assembly of FIGS. 11 and 12.

In particular, and referring now to FIG. 13, there is shown an anode 250 which, like anode 100 comprises a pair thin elongated alkali metal or lithium strips 252, 254 on opposite surfaces of a screen 256 of metal such as nickel. The anode assembly 250 is provided with electrical tabs or leads 258 for making electrical connection thereto. In accordance with this embodiment of the present invention, anode 250 is formed to include a plurality of scallops 262 along one edge thereof. The scallops 262 are equal in size and degree of curvature, and each scallop 262 has a curvature substantially equal to the curvature of surface 242 of subassembly 240. Thus, when anode 250 along with the cathode and separator are wound to form subassembly 240 in a manner similar to that of subassembly 130, the scallops 262 are substantially in registry with each other. As in the previous embodiment, anode 250 can be encapsulated in separator material, or a separate elongated strip of separator material can be provided.

Figure 14:
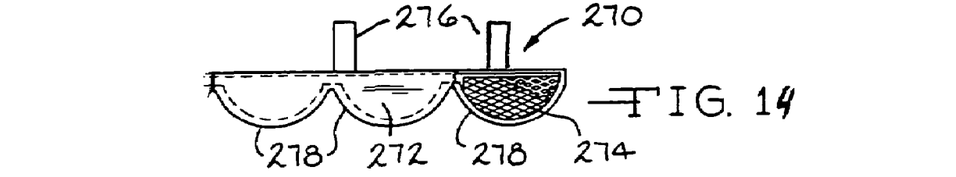
FIG. 14 is a side elevational view of the cathode in the sub-assembly of FIGS. 11 and 12.

FIG. 14 shows a cathode 270 which, like cathode 80, comprises an elongated strip of cathode active material 272 with a cathode current collector 274 embedded therein, collector 274 being a thin screen of metal such as titanium. The cathode assembly 270 is provided with electrical leads or tabs 276 for making electrical connection thereto. In accordance with this embodiment of the present invention, cathode 270 is formed to include a plurality of scallops 278 along one edge thereof. The scallops 278 are equal in size and degree of curvature, and each scallop 278 has a curvature substantially equal to the curvature of surface 242 of subassembly 240. Thus when cathode 270 along with the anode and separator are wound to form subassembly 240 in a manner similar to that of subassembly 130, the scallops 278 are substantially in registry with each other. As in the previous embodiment, cathode 270 can be encapsulated in separator material, or a separate elongated strip of separator material can be provided.

Figure 15:
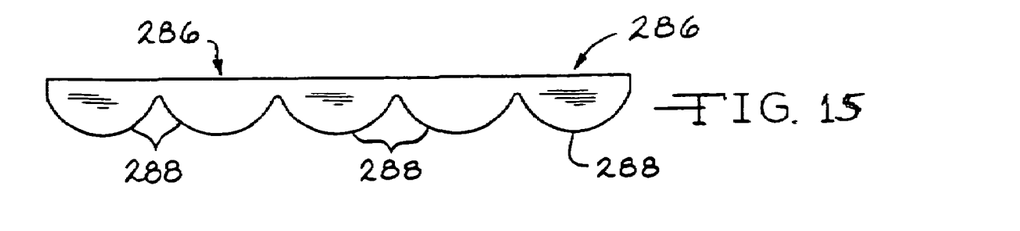
FIG. 15 is a side elevational view of the separator in the sub-assembly of FIGS. 11 and 12.

Referring now to FIG. 15 there is shown the elongated strip 286 of separator material mentioned hereinabove and which is the same material as the separator cell 10. In accordance with this embodiment of the present invention, separator 286 is formed to include a plurality of scallops 288 along one edge thereof. The scallops 288 are equal in size and degree of curvature, and each scallop 288 has a curvature substantially equal to the curvature of surface 242 of subassembly 240. Thus, when separator 286 along with the anode and cathode are wound to form subassembly 240 in a manner similar to that of subassembly 130, the scallops 288 are substantially in registry with each other.

In order to form subassembly 240, anode 250 and cathode 270 are placed in face-to-face relation with the scallops 262 and 278, respectively, in registry with each other. As in the previous embodiment, anode 250 is longer than cathode 270 so as to provide the double wrap portion or pocket previously described. If neither anode 250 nor cathode 270 is encapsulated in separator material, separator strip 286 is sandwiched therebetween with the scallops 288 thereof in registry with the scallops 262 and 278. Then the combination is wound and shaped to have a rectangular cross-section in a manner similar to the embodiment of FIGS. 1–10, with the first fold of the winding having the anode folded upon itself.

It is therefore apparent that the present invention accomplishes its intended objects. While embodiments of the present invention have been described in detail, that is for the purpose of illustration, not limitation.

What is claimed is:

1. A method of making an electrode assembly for an electrochemical cell comprising:

a) providing a combination of an elongated anode electrode, an elongated cathode electrode and separator therebetween in a face-to-face relationship wherein one of the anode and cathode electrodes is shorter in length than the other of the anode and cathode electrodes;

b) folding the combination using a mandrel to form an anode-cathode electrode assembly having a jellyroll configuration, said mandrel being of substantially rectangular cross-section having a pair of substantially parallel and planar oppositely-facing surfaces;

c) said folding the combination including a first step of folding the longer one of the electrodes on itself about the mandrel so that the separator on said longer one of the said electrodes contacts both of said oppositely-facing surfaces of said mandrel and subsequent steps of folding both of the electrodes about the mandrel to form the anode-cathode electrode assembly; and d) so that upon removal of the mandrel in the event any portion of the separator contacted by the mandrel is impaired only portions of the longer one of the electrode can contact each other thereby preventing any electrical short circuit due to the separator being impaired in a cell containing said anode-cathode electrode assembly.

2. The method according to claim 1, wherein said step of providing the anode and cathode with separator therebetween comprises encasing at least one of the anode and cathode in separator material.

3. The method according to claim 2, wherein both of the anode and cathode are encased in separator material.

4. The method according to claim 1, wherein said step of providing the anode and cathode with separator therebetween comprises providing an elongated separator in face-to-face relation with and between the anode and cathode.

5. The method according to claim 1, wherein said anode-cathode sub-assembly has an axis in a plane about which said electrodes are folded and is formed to have a curved edge surface that lies in a plane which is parallel to the plane containing the axis for conforming to a curved wall of a casing of an electrochemical cell containing said anode-cathode sub-assembly.

6. The method according to claim 5, wherein each of said anode, cathode and separator is provided with a plurality of scallops along one edge thereof wherein each of said scallops has a curvature corresponding to said curved surface of said anode-cathode sub-assembly.

7. The method according to claim 1, wherein said anode is of alkali metal and further comprising the steps of:
   a) placing the anode-cathode sub-assembly in a conductive cell casing of prismatic shape having opposed flat faces;
   b) attaching a lead of one of the anode or cathode to the cell casing and connecting a lead of the other of the anode or cathode to an electrical connector means extending through the casing in an insulated manner;
   c) introducing liquid electrolyte to said anode-cathode sub-assembly in said casing; and
   d) sealing said casing;
   e) whereby a solid cathode liquid electrolyte alkali metal high rate cell is formed including said electrode assembly.

8. The method according to claim 7, wherein said casing has a curved wall between the opposed flat faces thereof and wherein said anode-cathode sub-assembly has an axis in a plane about which said electrodes are folded and is formed to have a curved edge surface that lies in a plane which is parallel to the plane containing the axis which conforms to said curved wall of said casing.

9. The method according to claim 8, wherein each of said anode-cathode and separator is provided with a plurality of scallops along one edge thereof wherein each of said scallops has a curvature corresponding to said curved surface of said anode-cathode sub-assembly.

10. The method according to claim 1, wherein said anode is of lithium.

11. An electrode assembly for an electrochemical cell comprising the combination of an elongated anode electrode, an elongated cathode electrode and separator therebetween in a face-to-face relationship wound in a prismatic shaped jellyroll configuration wherein at the innermost portion of the assembly one of the electrodes is folded upon itself to define a substantially rectangular-shaped pocket with only separator therein so that in the event that any portion of the separator within said pocket is damaged only portions of said one electrode can contact each other thereby preventing an electrical short circuit in a cell containing said anode-cathode electrode assembly.

12. An electrode assembly for an electrochemical cell comprising:
   a) the combination of an elongated anode electrode, an elongated cathode electrode and separator therebetween in a face-to-face relationship and wound in a prismatic shaped jellyroll configuration;
   b) one of the anode and cathode electrodes being shorter in length than the other of the anode and cathode electrodes;
   c) the longer of the electrodes being folded upon itself at the innermost portion of the assembly to include two substantially flat sections of the longer electrode facing each other with only a substantially flat section of separator therebetween; and
   d) so that in the event of damage to the separator between the two sections of the longer electrode only those two sections can contact each other thereby preventing any electrical short circuit in a cell containing said anode-cathode assembly.

13. A solid cathode liquid electrolyte alkali metal high rate cell comprising:
   a) a casing of electrically conductive material and of prismatic shape having opposed flat faces;
   b) an electrode assembly comprising the combination of an elongated anode electrode, an elongated cathode electrode and separator therebetween in a face-to-face relationship wound in a prismatic shaped jellyroll configuration wherein at the innermost portion of the assembly one of the electrodes is folded upon itself to define a substantially rectangular-shaped pocket with only separator therein so that in the event that any portion of the separator within said pocket is damaged only portions of said one electrode can contact each other thereby preventing an electrical short circuit in said cell;
   c) a non-aqueous liquid electrolyte in said casing and operatively contacting said anode and said cathode;
   d) means for electrically connecting one of said anode or cathode to said casing;
   e) means for electrically connecting the other of said anode or cathode to an electrical connector means extending through said casing in an insulated manner; and
   f) means for hermetically sealing said casing.

14. A cell according to claim 13, wherein said anode is of lithium.

15. A cell according to claim 13, wherein said anode is connected electrically to said casing to provide a cell of case negative electrical configuration.

16. A cell according to claim 13, wherein said casing has a curved wall between the opposed flat faces thereof and wherein said anode-cathode sub-assembly has an axis in a plane about which said electrodes are folded and has a curved edge surface that lies in a plane which is parallel to the plane containing the axis which conforms to said curved wall of said casing.

17. A cell according to claim 16, wherein each of said anode and cathode has a plurality of scallops along one edge thereof wherein each of said scallops has a curvature corresponding to said curved surface of said anode-cathode sub-assembly.

18. A cell according to claim 17, further including an elongated separator between said anode and cathode and having a plurality of scallops along one edge thereof wherein each of said scallops has a curvature corresponding to said curved surface of said anode-cathode sub-assembly.

19. A cell according to claim 13, for an implantable cardiac defibrillator.

* * * * *